United States Patent [19]

Everett

[11] 4,027,943
[45] June 7, 1977

[54] SOLAR PROMINENCE ADAPTER

[76] Inventor: George Everett, Belden Road, Burlington, Unionville, Conn. 06085

[22] Filed: Sept. 19, 1975

[21] Appl. No.: 615,126

Related U.S. Application Data

[63] Continuation of Ser. No. 399,693, Sept. 24, 1973, abandoned.

[52] U.S. Cl. .................................. 350/17; 350/18; 350/166
[51] Int. Cl.² ......................................... G02B 23/00
[58] Field of Search ...................... 350/17, 18, 166

[56] References Cited

UNITED STATES PATENTS

| | | | |
|---|---|---|---|
| 2,379,153 | 6/1945 | Holste | 350/17 |
| 2,834,246 | 5/1958 | Foskett et al. | 356/51 X |
| 3,278,752 | 10/1966 | Brixner | 350/166 X |
| 3,351,408 | 11/1967 | Krewalk | 350/69 |
| 3,776,642 | 12/1973 | Anson et al. | 356/188 |

OTHER PUBLICATIONS

Miczaika et al., Tools of the Astronomer, Harvard U. Press, Cambridge, pp. 233–257, 1961.

King, The History of the Telescope, Chas. Griffin & Co. Ltd., London, pp. 378–386, 1955.
Pendray, Men, Mirrors and Stars, Harper & Bros., New York, pp. 192, 193, 298b–298d, 1946.

Primary Examiner—John K. Corbin
Assistant Examiner—Matthew W. Koren
Attorney, Agent, or Firm—Shapiro and Shapiro

[57] ABSTRACT

A solar prominence adapter comprises a tubular housing having a first end adapted for connection with the eyepiece holder of a conventional reflecting or refracting telescope and the other end for connection with a conventional eyepiece. The housing includes an occulting disc positioned in a first plane for eclipsing or occulting an image of the sun present in that plane. A focusing system is provided for focusing the occulted image onto a second focal plane in which the image may be viewed by means of the conventional eyepiece. Supported in the housing is a prism for attenuating the solar radiation which is directed into the housing by the telescope when the adapter and telescope are connected. The housing may further include a filter for filtering out all but a narrow bandwidth of solar radiation and an adjustable diaphragm for varying the intensity of the observed image.

6 Claims, 3 Drawing Figures

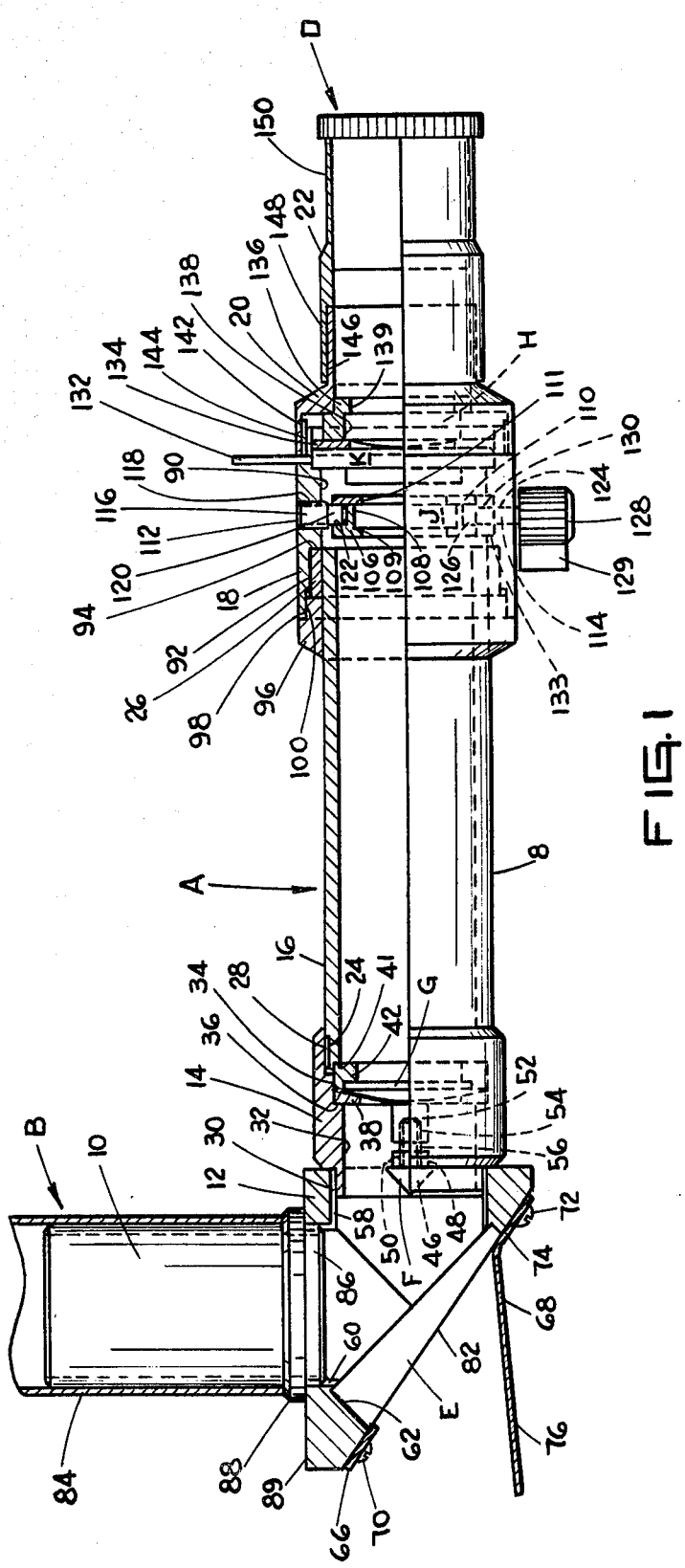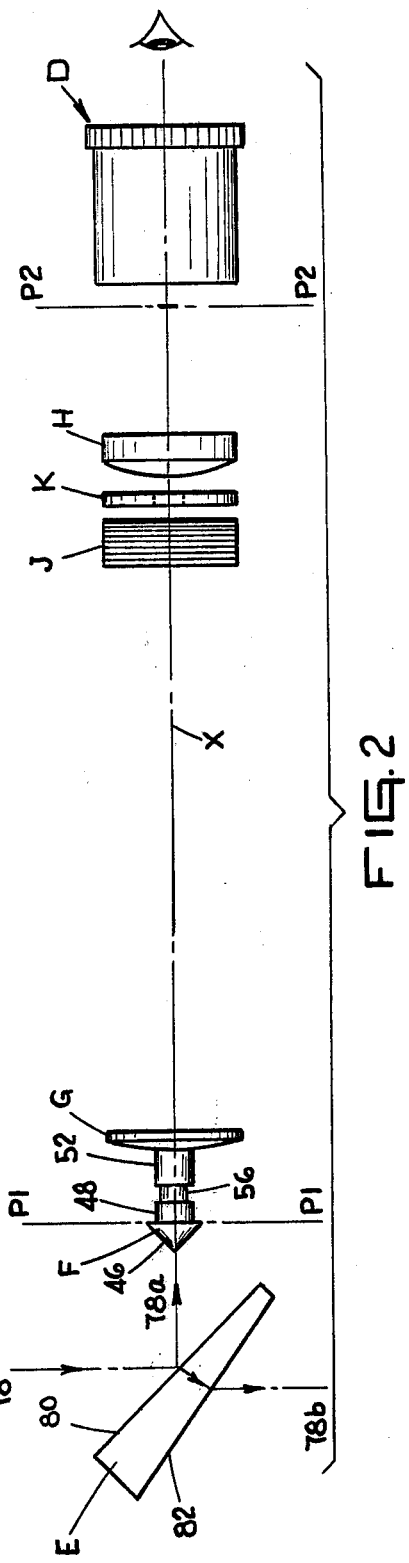

SOLAR PROMINENCE ADAPTER

This is a continuation of application Ser. No. 399,693 filed Sept. 24, 1973, now abandoned.

The invention relates to an adapter for a conventional telescope which enables the telescope to be used for direct observation of the prominences of the sun.

BACKGROUND OF THE INVENTION

Special telescopes for directly observing the prominences of the sun are known in the art. However, telescopes of this special type are costly and therefore unavailable to most telescope users of amateur status.

One type of adapter for enabling a conventional astronomical telescope to be utilized for observing solar phenomena is disclosed in the U.S. Pat. No. 3,351,408 to Krewalk. The adapter essentially includes a green filter glass for filtering out ultra-violet and infra-red rays which can cause permanent injury to the retina of the eye, and an aluminum-coated quartz lens for attenuating the light passing through the adapter. One end of the adapter housing is intended to be connected with the eye-piece holder of the telescope and the other end receives a conventional eyepiece or ocular. When the telescope, adapter, and eyepiece are connected together, the quartz lens effectively increases the focal length of the telescope for enabling the filtered, attenuated image of the sun to be viewed by the displaced eyepiece. However, although the adapter of Krewalk is suitable for permitting direct observation of certain surface phenomena of the sun, such as sun-spot activity, it is not suited for enabling clear, direct observation of the prominences on the sun except during periods of solar eclipse.

SUMMARY OF THE INVENTION

It is the primary object of the invention to provide an adapter for use with a conventional telescope for enabling direct observation of solar prominences at any time that the sun is visible.

Pursuant to the foregoing primary objective, another object of the invention is to provide a solar prominence adapter for use with a conventional telescope for enabling direct observation of a particular wavelength of radiation emitted by the solar prominences.

It is a further object of the invention to provide a solar prominence adapter having a simple construction and requiring a minimum number of optical elements. As a result, the adapter may be inexpensively manufactured, thus making available to telescope users of amateur status an inexpensive solar prominence adapter for use with a conventional telescope.

A solar prominence adapter made in accordance with the invention is constructed to be connected between the eyepiece holder of a conventional telescope and a conventional eyepiece. Included in the adapter are occulting means for artificially eclipsing or occulting an image of the sun and a lens system for focussing the occulted image onto a plane wherein the image may be viewed by means of the eyepiece. The adapter preferably includes means for attenuating the light which enters the adapter and a filter for filtering out all but a predetermined range of light frequencies. An adjustable diaphragm may also be provided for varying the intensity of the observed image.

These and other objects and advantages of the invention will be apparent from the following detailed description of a preferred embodiment of the invention.

BRIEF DESCRIPTION OF THE DRAWINGS

FIG. 1 is a side elevational view, partly broken away and in cross-section, of a solar prominence adapter made in accordance with the invention.

FIG. 2 is a side view of the optical elements of the solar prominence adapter of FIG. 1.

DESCRIPTION OF THE PREFERRED EMBODIMENT

Figure 3:
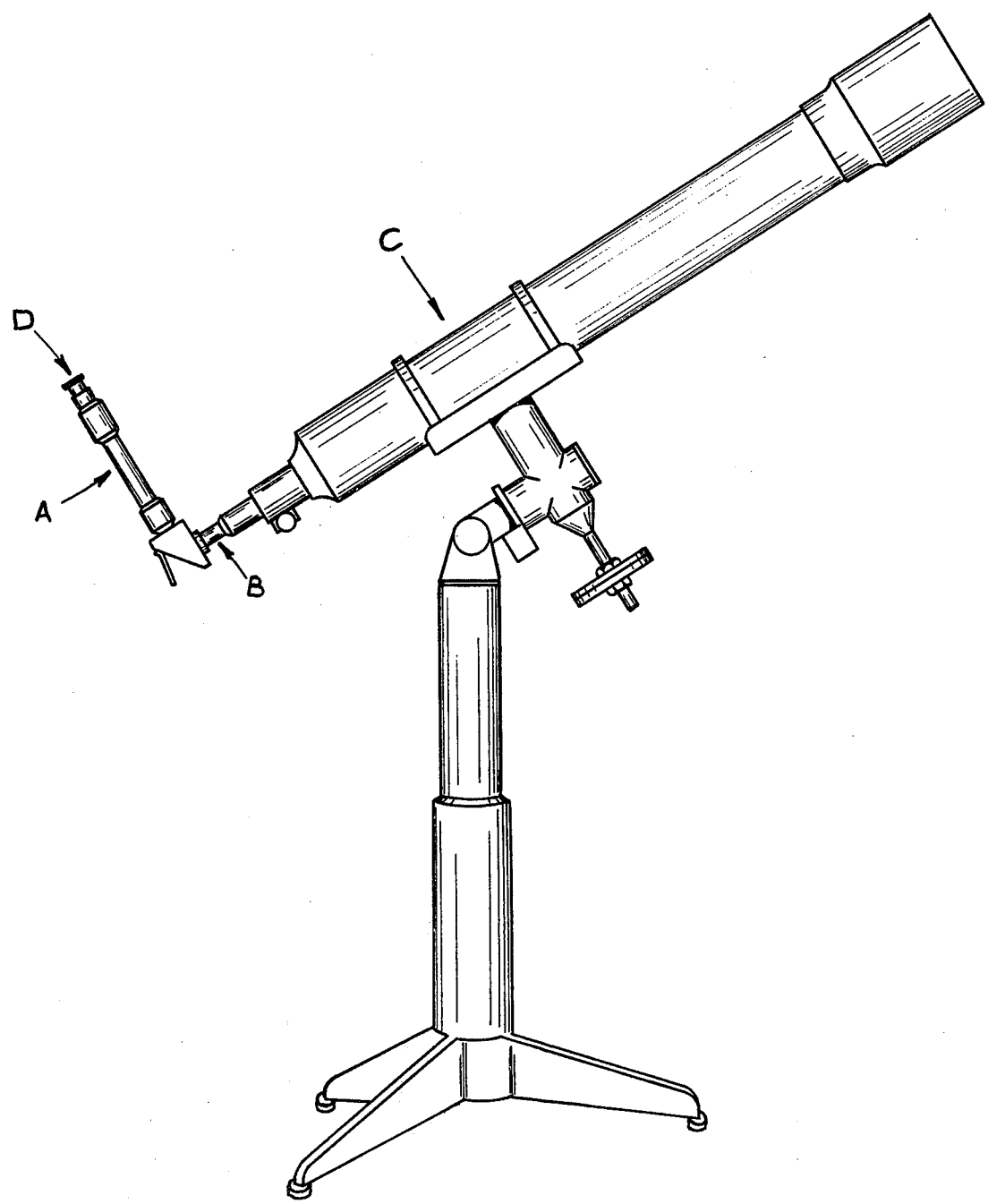
FIG. 3 is a side view of the solar prominence adapter of FIG. 1 as it may be connected between a refracting telescope and an eyepiece.

Referring to FIG. 3, a solar prominence adapter A constructed in accordance with the invention is adapted to be connected between the eyepiece holder B of a conventional refracting astonomical telescope C and a conventional eyepiece D for enabling the telescope to be utilized for artificially eclipsing and directly viewing the sun. As shown in FIGS. 1 and 2, adapter A in its preferred embodiment includes a prism E for attenuating the solar radiation which is directed into the adapter A through eyepiece holder B when the adapter and telescope C are connected, an occulting disc F positioned in a first plane P1 for eclipsing or occulting an image of the sun present in that plane, a focusing system including field lens G and relay lens H for focusing the occulted image onto a second focal plane P2 in which the image may be viewed by means of a conventional eyepiece D, a filter J for filtering out all but a narrow bandwidth of solar radiation, and an adjustable diaphragm K for varying the intensity of the observed image.

Referring to FIG. 1, the adapter A comprises a housing 8 having a first coupling portion or draw tube attachment 10 adapted for connection to the eyepiece holder or draw tube B of a conventional telescope, a prism holder 12, a field lens barrel 14, a main barrel 16, a diaphragm and filter holder 18, an eye end cap 20, and a second coupling portion or eyepiece adapter 22 adapted for connection with a conventional eyepiece or ocular D. The longitudinal axes of field lens barrel 14, main barrel 16, diaphragm and filter holder 18, eye end cap 20 and eyepiece adapter 22 are positioned on an axis X, which is shown in FIG. 2 and hereinafter referred to as the longitudinal axis of the housing.

As shown in FIG. 1, main barrel 16 of the housing 8 is a tubular member having threads 24 on the outer surface thereof at one end and having an annular ring or flange 26 attached to the outer surface at the other end. Connected with main barrel 16 is field lens barrel 14, a tubular member having threads 28 on the inner surface at one end for engaging the threads 24 of the main barrel and having threads 30 on the outer surface at the other end for engaging prism holder 12. The inner surface of field lens barrel 14 comprises a first surface portion 32 having a first diameter, and a second surface portion 34 having a second diameter larger than the first diameter, forming a shoulder or seat 36. Positioned in the field lens barrel and adjacent the shoulder 36 is an annular field lens spacer 38, preferably formed of Teflon or a similar plastic material. Positioned adjacent the spacer 38 is field lens G which is centered on the longitudinal axis X by means of an annular field lens holder 42. Lens holder 42 is held in place in the field lens barrel 14 by the circular end 41 of main barrel 16 when the field lens barrel and the main barrel are screwed together by means of threads 24 and 28.

An occulting or eclipsing disc F is mounted on the center of the field lens G for providing an artificial eclipsing or occulting of the image present in plane P1. Plane P1 corresponds to the final focal plane of the telescope C when the adapter A and telescope C are connected together. The size of the image produced in plane P1 is directly related to the focal length of the telescope. More specifically, the size of the image of the sun produced in the final focal plane of the telescope is approximately equal to the focal length of the telescope multiplied by 0.01. Therefore, the diameter of the occulting disc is calculated with reference to the focal length of the telescope with which the solar prominence adapter is to be used. As for the shape of the occulting disc F, it will be apparent that the occulting disc may take any form which will enable it to occult or eclipse an image of the sun. A simple planar disc would suffice, for example. However, in its preferred form the occulting disc is a cone having its axis of symmetry on the longitudinal axis X of the housing. As shown in FIG. 1, the occulting disc F includes a conical portion 46 and a base portion 48 having an threaded opening 50 therein. Attached to the center of the field lens G and positioned on the longitudinal axis X of the housing is a post 52 having a threaded opening 54 therein. Removably connecting the occulting disc F to the post 52 is a screw 56. This screw connection facilitates mounting on lens G occulting disc F having different diameters for enabling the solar prominence adapters to be assembled for use with telescopes having different focal lengths and different image sizes.

The field lens barrel 14 is further removably connected to a prism or wedge holder 12. The wedge holder 12 includes a first circular threaded opening 58 for engaging threads 30 of the field lens barrel 12 for connecting the wedge holder to the field lens barrel. The center axis of opening 58 therefore lies on the longitudinal axis X of the housing. Wedge holder 12 is further provided with a second circular threaded opening 60 having its center axis perpendicular to the first coupling portion or draw tube attachment 10. Supported by wedge holder 12 at a 45° angle with respect to the longitudinal axis X is a conventional Herschel prism E for attenuating the light which is received by the telescope and directed through draw tube attachment 10 of housing 8. Attenuation is necessary because the light gathered by the telescope when it is directed at the sun is sufficiently intense to cause permanent damage to the retina of the eye if viewed directly. Securing the prism E in an opening 62 in the wedge holder 12 are wedge plate 66 and shield 68. Wedge plate 66 is removably attached to wedge holder 12 by a first screw 70 and a second screw (not shown). Similarly, shield 68, which comprises two sections, 74 and 76, is removably attached to the wedge holder by a first screw 72 and a second screw (not shown). The first rectangular section 74 secures Herschel prism E in place in the same manner as does wedge plate 66, described above. The second rectangular section 76 is disposed at an angle with respect to first section 74 for intercepting and diffusing the light which passes through prism E from the telescope. Shield section 76 also functions as a protective cover for the exposed surface 82 of Herschel prism E.

The interaction of the Herschel prism with the light received from the telescope C will now be described with reference to FIG. 2. As shown in FIG. 2, the light ray 78 which impinges upon surface 80 of the prism E is split into two component light rays, 78a and 78b. Light ray 78a is produced by reflection of part of ray 78 at surface 80 and is directed along the longitudinal axis of the housing. Light ray 78b is the part of light ray 78 which is not reflected by surface 80, but instead is refracted at surfaces 80 and 82 of the prism E and leaves the prism in a direction substantially perpendicular to the longitudinal axis X. The Herschel prism utilized in the preferred embodiment of the invention relfects approximately 5% of the incident light at surface 80 and transmits the remaining 95% of the light through the prism.

Referring to FIG. 1, when the telescope is directed toward the sun the light reflected by surface 80 of the Herschel prism E forms an image of the sun in plane P1. The light transmitted through the prism E is directed out of the housing and toward the shield section 76, where part of the light energy will be absorbed and the remainder diffused. The 90° reflection at prism surface 80 enables the axis of the eyepiece D to be positioned perpendicular to the longitudinal axis of the refracting telescope C, thereby permitting the user to view the occulted image of the sun from a more comfortable, erect position, as will be apparent from a viewing of FIG. 3.

It will be apparent that attenuation of the light energy received by the solar prominence adapter may be effected in other ways. For example, field lens G could include a layer of reflective metal, such as aluminum, deposited to a thickness whereby the lens transmits approximately 5% of the light incident thereon. In this manner, both prism E and the right-angle connection provided by prism holder 12 may be eliminated and the first coupling portion 10 may be directly connected to field lens barrel 14 to provide a solar prominence adapter having both coupling portions on the longitudinal axis X of the housing.

Removably connected to the wedge holder 12 is draw tube attachment 10 which includes a tubular portion 84, a threaded portion 86 for engaging threaded opening 60 of the wedge holder 12, and a flange 88 for abutting the surface 89 of the wedge holder when the draw tube attachment 10 has been screwed into opening 60 of the wedge holder By means of tubular portion 84 the solar prominence adapter may be connected to the draw tube B of a conventional refracting type telescope, as shown in FIG. 3. However, it will be apparent that draw tube attachment 10 may be in the form of a coupling tube having the same diameter as a conventional eyepiece, whereby the solar prominence adapter may be received by the eyepiece holder of a conventional reflecting type astonomical telescope.

Referring to FIG. 1, at the flanged end of main barrel 16 is connected the tubular diaphragm and filter holder 18. Supported in te holder 18 is a filter J for filtering out all the solar radiation with the exception of a narrow band of frequencies of visible light.

It will be understood that various filters may be utilized in the apparatus of the invention for filtering out unwanted radiation, particularly radiation in the ultraviolet and infra-red ranges which may cause permanent injury to the retina of the eye. One type of filter for filtering out harmful ultra-violet and infra-red radiation is a planar green glass filter of the type used in welder's goggles to filter out the harmful rays from acetylene and electric arc-welding and cutting. It will also be understood that narrow-band optical filters may be utilized for examining particular spectral components of the occulted solar image. For example, it has been determined that solar prominences are best observed at the Hydrogen-alpha (H$\alpha$) line in the solar spectrum, corresponding to a wavelength of 6562.8 Angstroms. At this wavelength, the huge hydrogen explosions which form the solar prominences are particularly visible. Therefore, in the preferred embodiment of the invention, shown in FIGS. 1 and 2, filter J is a multilayer interference filter capable of passing a narrow bandwidth of solar radiation at the H$\alpha$ wavelength. Multilayer interference filters of this type are available commercially. For example, the "single period" Hydrogen-Alpha Pre-blocking filter manufactured by Spectro-Film, Inc. of Winchester, Mass., may be utilized. Because the center frequency of that particular filter is determined by the angle of incidence of the light, the filter must be rotatable to permit "tuning" of the filter to the desired frequency or wavelength. Accordingly, the solar prominence adapter of the invention provides means for rotating the filter J about the longitudinal axis X and also provides means for rotating the filter about an axis perpendicular to the longitudinal axis X, as will be described hereinbelow.

The inside surface of the diaphragm and filter holder 18 includes a first cylindrical surface 90 having a first diameter, and a second cylindrical surface 92 having a diameter greater than that of surface 90 for receiving flange 26 of main barrel 16. The point of transition between the first surface portion 90 and second surface portion 92 forms a shoulder or seat 94 in the holder 18. The diaphragm and filter holder 18 is rotatably connected to the main barrel 16 by means of an annular rotating nut 96 which includes an outer threaded surface 98 which engages the inner threaded surface 100 of the holder 18. With rotating nut 96 and holder 18 thus connected, flange 26 of the main barrel 16 is held therebetween, permitting the rotating nut 96 and diaphragm and filter holder 18 to be rotated together with respect to the main barrel 16. If, however, the rotating nut is turned fully clockwise with respect to diaphragm and filter holder 18, the rotating nut forces flange 26 of the main barrel against shoulder 94 of the diaphragm and filter holder, thereby locking the diaphragm and filter holder and main barrel together for preventing any rotation therebetween. Supported within diaphragm and filter holder 18 and rotatable with it about longitudinal axis X is filter J.

Means for rotating filter J about an axis perpendicular to the longitudinal axis X is also provided. Filter J is supported by an annular filter support 106 which includes an opening 108 for receiving the filter and an opening 109 for permitting light to impinge upon the surface of the filter. An annular filter holder plate 110 having an opening 111 therein is provided for securing the filter J in opening 108. Means (not shown, but preferably screws) are provided for removably attaching the filter holder cover 110 to the filter support 106. For enabling filter J to be rotated about a transverse axis of diaphragm and filter holder 18, filter support 106 is pivotably supported by screw 112 and pin 114. Screw 112 has a threaded portion 116 which engages threaded opening 118 in diaphragm and filter holder 18, and has an unthreaded end 120 which is pivotably received by an opening 122 in filter support 106. Pin 114 extends through an opening 124 in diaphragm and filter holder 18 and is received by a opening 126 in filter support 106. Filter support 106 is provided with a set screw (not shown) for securing the pin 124 is opening 126 to prevent rotation of the pin in the opening. In this manner, filter support 106 and pin 114 rotate together, but screw 112 does not rotate. Non-rotatably connected to the end of pin 114, which extends outwardly from the holder 18 through opening 124, is a manually rotatable knob 128 for controlling the angle at which light rays strike filter J as they pass through the housing 8 in the direction of longitudinal axis X. The knob may include a projecting portion 129 for providing an external indication of the angular position of filter J. For providing variable axial tension to the filter support 106, a tension ring 130 is positioned in a circular recess 133 in the inner surface 90 of diaphragm and filter holder 18 and is cooperable with the position of adjustable screw 112 for providing the desired amount of axial tension to the filter support 106. By rotating screw 112 clockwise, the tension can be increased until a point is reached at which the filter support 106 is essentially non-rotatable. In this manner, the screw 112 may be utilized to lock the filter support 106 in any desired rotational position with respect to the transverse axis defined by pin 114 and screw 112.

A conventional diaphragm K is mounted in diaphragm and filter holder 18 and has its aperture center on the longitudinal axis X. The size of the diaphragm aperture is controlled by means of lever 132 connected thereto for varying the amount of light passing through the solar prominence adapter and, consequently, the intensity of the observed image. Adjacent the diaphragm K is positioned an annular spacer 134, preferably made of Teflon, for separating the diaphragm from annular relay lens holder 136, which supports relay lens H in an opening 138 therein. Relay lens holder 136 is further provided with an opening 139 for permitting the light which has passed through diaphragm K to form an occulted image in plane P2, wherein the image may be viewed by means of eyepiece D. Relay lens holder 136 is forced against the spacer 134 by the action of eye end cap 140, which includes an inner threaded surface 142 for engaging the outer threaded surface 144 of diaphragm and filter holder 18. Eye end cap 140 further includes tubular portion 146 for being received by tubular section 148 of eyepiece adapter 22. A tubular portion 150 of eyepiece adapter 22 is adapted for receiving a conventional eyepiece D. Tubular sections 148 and 150 of eyepiece adapter 22 may be provided with pairs of longitudinal slits (now shown) for enabling the diameters of the sections to be increased slightly when they receive portion 146 and eyepiece D, respectively.

The interior surfaces of each of the housing components are made non-reflective by means of a light-energy-absorbing material affixedly applied to all inner surfaces.

Referring to FIG. 2, operation of the lens system will now be described. As mentioned above, the final focal plane of the telescope C coincides with plane P1 of the solar prominence adapter A when the adapter and the telescope are properly connected. Consequently, an image of the sun will appear in that plane when the telescope is directed toward the sun. For this reason, the occulting disc F is positioned in plane P1 for artificially eclipsing or occulting the image of the sun present therein. Because the solar prominence adapter has necessarily been inserted between the eyepiece holder B of the telescope C and the eyepiece D, it is no longer possible for the eyepiece to be positiond near enough to the final focal plane P1 of the telescope for optimum viewing. To overcome this problem, a lens system including substantially plano-convex lenses G and H is utilized to focus the occulted image present in plane P1 onto a second plane, P2, whereby the eye-piece may be positioned properly with respect to that plane for viewing the image in that plane. Although a single lens system could be utilized for this purpose, in the preferred embodiment of the invention, which includes an angle-sensitive filter J, a dual lens system is preferred for obtaining improved response from the filter for the following reasons. Because the filter J is angle-sensitive, it is desirable to have the light rays from the occulted image of the sun impinging upon the surface of the filter as nearly as practicable to the same angle of incidence so that for a given agular position of filter J the filter provides nearly uniform response for all the light rays of the image. Accordingly, the effect of field lens G is to reduce the degree of divergence of the light rays emanating from the image in plane P1 before the light rays strike the surface of the filter J. By reducing the degree of divergence of the rays, i.e. making the light rays more nearly parallel, lens G enables filter J to respond to the incident rays in a manner more uniform than if the rays were allowed to impinge upon the filter without passing through the lens. Filter J may be tuned to the desired wavelength by changing the angle at which the filter interupts the light directed through it by field lens G. For this purpose, filter J is movable about two axes which are perpendicular to each other. Thus, diaphragm and filter holder 18 may be rotated with respect to main barrel 16 for rotating filter J about longitudinal axis X of the housing 8, and filter support 106 may be rotated about the axis defined by screw 112 and pin 114 by means of knob 128 for rotating the filter about that axis. The function of relay lens H is to focus the rays passed by filter J onto the second plane P2 where the image may be viewed by means of conventional eyepiece D. Should the image be too dark or too bright, the intensity of the image may be varied by adjusting the size of the aperture in diaphragm K.

It is believed that the advantages and improved results furnished by the solar prominence adapter of the invention will be apparent from the foregoing description of a preferred embodiment thereof. Various changes and modifications may be made without departing from the spirit and scope of the invention, as sought to be defined in the following claims.

I claim:

1. A solar prominence adapter for a telescope, comprising:
   a housing having a first coupling portion adapted for connection with the eyepiece holder of the telescope and a second coupling portion adapter for connection with an eyepiece;
   occulting means supported inside the housing in a first plane and on the longitudinal axis of the housing for occulting an image in that plane;
   means supported inside the housing and on said longitudinal axis for focusing the occulted image in a second plane whereby the occulted image in the second plane may be viewed by means of an eyepiece connected to the adapter,
   a filter supported inside the housing on the longitudinal axis, the filter being rotatable about the longitudinal axis of the housing and pivotable about an axis perpendicular to the longitudinal axis of the housing for enabling the filter to be tuned to the desired optical wavelength; and
   means adjacent the first coupling portion for attenuating the radiation entering the housing to enable viewing of solar prominences when the adapter is positioned between the eyepiece holder of the telescope and the eyepiece.

2. A solar prominence adapter as set forth in claim 1, wherein the means for focusing comprises first and second lenses having their optical axes on the said longitudinal axis of the housing, the lenses being positioned on opposite sides of the filter for decreasing the angle of divergence of the light rays impinging on the filter and for focusing onto said second plane the rays passed by the filter respectively.

3. A solar prominence adapter as set forth in claim 2, wherein the occulting means is supported by and connected to the center of the first lens.

4. A solar prominence adapter as set forth in claim 1, wherein the occulting means is a cone having its axis of symmetry on the longitudinal axis of the housing.

5. A solar prominence adapter as set forth in claim 1, wherein said means for attenuating is a Herschel prism positioned between the first coupling portion and said first plane, said prism reflecting a small percentage of the incident radiation in the direction of the longitudinal axis and transmitting the remainder of the radiation in another direction outwardly from the housing.

6. A solar prominence adapter as set forth in claim 1, further comprising a manually adjustable diaphragm mounted in the housing for varying the amount of light passing through the adapter.

* * * * *